June 16, 1936.  R. S. TROTT  2,044,714
ENGINE MOUNTING
Filed Nov. 30, 1932  2 Sheets-Sheet 1
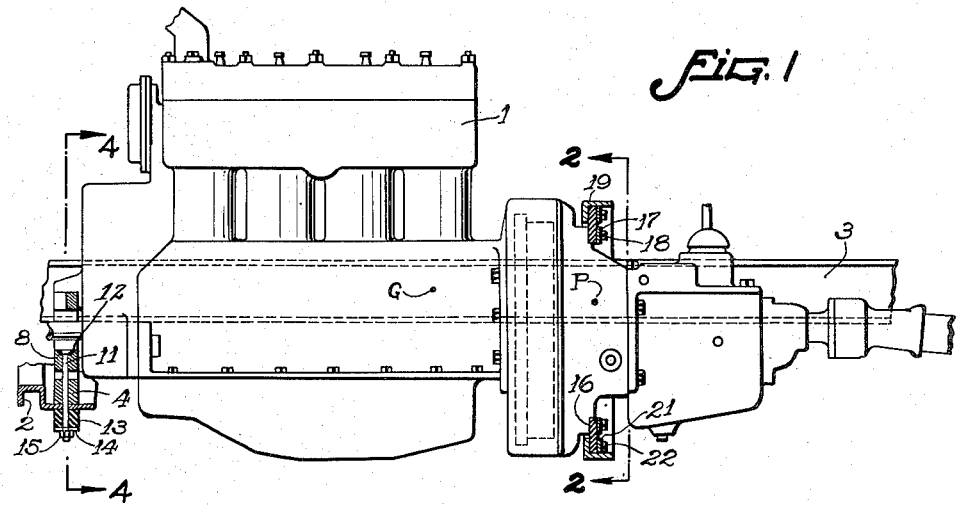
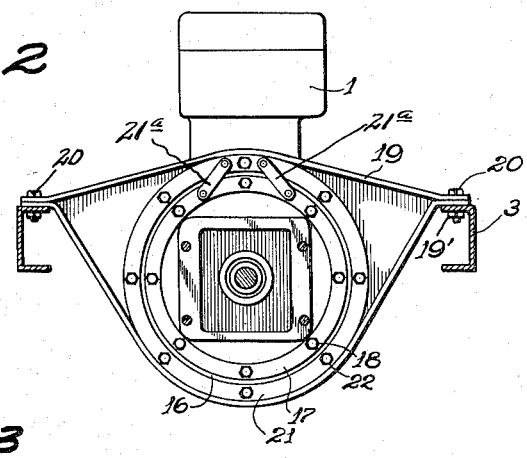
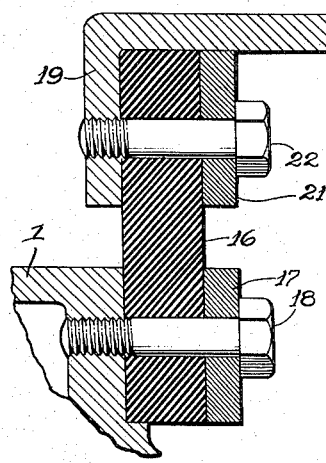
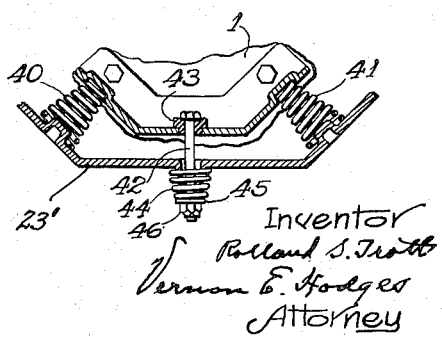
Inventor
Rolland S. Trott
Vernon E. Hodges
Attorney

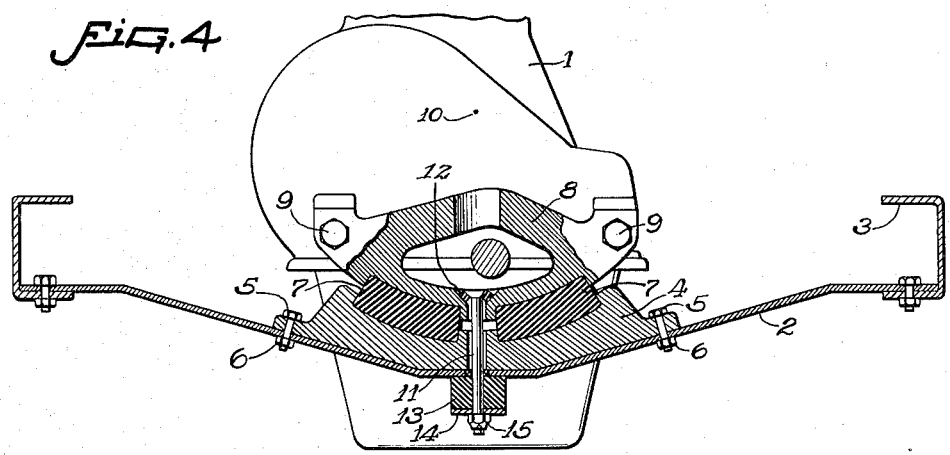
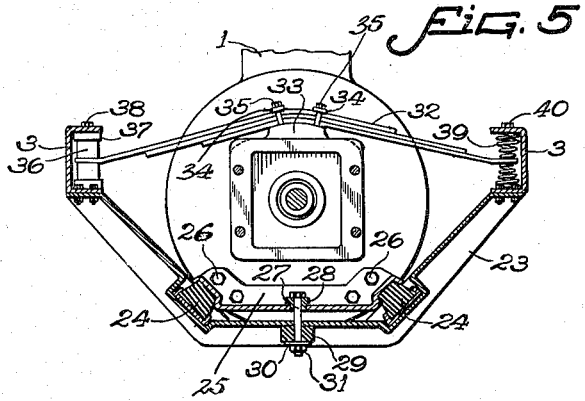
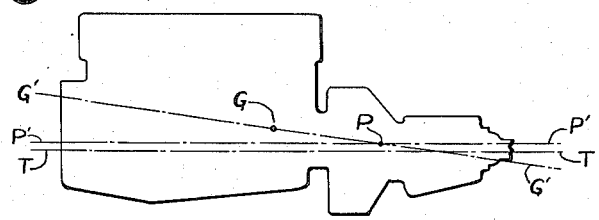

Patented June 16, 1936

2,044,714

UNITED STATES PATENT OFFICE 2,044,714

ENGINE MOUNTING

Rolland S. Trott, Denver, Colo.

Application November 30, 1932, Serial No. 645,071

11 Claims. (Cl. 248—7)

My invention relates to engine mountings for mounting engine units upon their frames or supports in such a way as to substantially prevent the transmission of the engine vibration or sensation from the engine unit to the frame or support.

In the ordinary automotive vehicle, the forces incident to the operation of the engine unit produce a result which may be recognized by driver or passengers as engine sensation. This will vary in different engine units depending upon the weight and balance of the moving parts, number and location of cylinders, cylinder compression, and various other design and construction features of the engine unit.

The sensation which is felt by the occupants of the vehicle may be due to the intermittence or variation of torque reaction, or to the action of the moving parts entirely aside from the torque of the engine unit, or may be due, in varying relative proportion, to both of these causes.

The action of the explosive forces and the resulting torque reactions are naturally very closely related, and in present well-designed and carefully balanced and constructed engines, these forces produce the larger portion of the engine sensation that may be felt in the support, frame, or body of the vehicle.

It is the object of this invention, therefore, to provide an engine mounting which will be directed especially toward the elimination of the engine sensation in the support, frame, or body, which comes from the explosive and torque forces.

I accomplish this object by providing a front mounting for the engine unit upon its support or frame which will provide substantially pivotal as well as orbital movement, and by providing a rear mounting for the engine unit upon its support or frame which is located adjacent the transverse plane passing through the center of percussion of the engine unit, which rear mounting is adapted to provide substantially pivotal as well as orbital movement and by providing stabilizer or torque transmitting means between the engine unit and the frame.

All of this is fully described and illustrated in the drawings, in which:

Fig. 1 is a side elevation and partial section of an engine unit upon its support or frame;

Fig. 2 is a section on the line 2—2 of Fig. 1;

Fig. 3 is an enlarged fragmentary section of a part of the rear mounting shown in Fig. 1;

Fig. 3—A is a modified form of mounting which may be used for either the front or rear mounting, or for both the front and rear mountings of the engine unit;

Fig. 4 is a section on the line 4—4 of Fig. 1;

Fig. 5 is a modified form of rear mounting, which, if desired, may also be used as a modified form of front mounting.

Fig. 6 is a diagrammatic view of a power plant showing the axis of the crankshaft, an axis parallel to the crankshaft and passing through the center of percussion of the engine unit, and an axis passing through both the center of percussion and the center of gravity of the engine unit.

Fig. 7 is a diagram illustrating how the center of oscillation provided by a mounting may be varied in height by variation of the radius of the mounting.

Referring now to the drawings, in Figs. 1 and 4, the engine unit 1 is mounted at the front upon the cross-member 2 of the frame 3 by a front mounting which is constructed as follows:

The seat 4 is secured to the cross-member 2 by the bolts 5 and the nuts 6, or in any other proper manner, and is provided with depressions to receive and locate the rubber blocks 7. The engine bracket 8 is secured to the engine unit 1 by the bolts 9 or in any other proper manner, or may even be integral therewith, and is provided with depressions to receive and locate the rubber blocks 7. The rubber blocks 7 are to be formed on an arc of a circle whose center is at the point 10 in Fig. 4. This point 10 may be raised or lowered by a change in the radius of the arc on which the rubber is formed. This is illustrated in Fig. 7 in which the change from the radius B to the radius C will raise the center of oscillation provided by the mounting, a distance A.

The hold-down bolt 11 passes through the bracket 8, the cushion bushing 12, the rebound rubber block 13 and the plate 14, and receives the hold-down nut 15. The bushing 12 may be eliminated, if desired, and the head of the bolt 11 seated directly in the bracket 8. It will be seen that this mounting by virtue of the action of the rubber blocks 7 will provide substantially pivotal movement about the center 10.

The rebound bolt 11 and its coacting parts act to prevent excessive upward movement of the engine mounting 1 with respect to the cross-member 2. Any other proper form, design, system, material, construction or location of the front mounting may be used in place of the construction shown in Fig. 4 so long as it will give the desired degree of substantially pivotal and orbital movements.

In Fig. 1, the center of percussion of the engine unit is diagrammatically indicated at the point P. The center of percussion referred to is that obtained when the engine unit is suspended at the front end from a point in the longitudinal central vertical plane of the engine unit. When thus suspended, a transverse blow directed at the center of percussion will provide a minimum of shock upon the point of suspension. Variation of the position of the point of suspension in said central vertical plane will have substantially no effect upon the longitudinal position of the center of percussion. This center of percussion will naturally vary in position with the design, construction, and other features of each engine unit. The center of percussion, as indicated in Fig. 1, is, however, sufficiently close for illustration purposes. The rubber ring 16 is secured to the engine unit 1 by the ring 17 and bolts 18, or in any other proper manner. The cross member 19 is secured to the frame 3 by the bolts 20, and nuts 19' or in any other proper manner, and the rubber ring 16 is secured to the cross member 19, by the ring 21 and bolts 22. If desired, the rubber ring may be vulcanized to the rings 17 and 21. Turning movement between the rings 17 and 21 is restrained by rubber links 21a.

This constitutes a mounting for the rear of the engine unit that is substantially in line with the center of percussion of the engine unit and which provides resilient orbital movement of the rear of the engine unit as well as permitting substantially pivotal movement thereof.

As shown, this mounting is concentric with the crankshaft, but it may, by slight variation of the parts, be made concentric with the center of percussion if desired. In any case, the better of these two locations of the center of the rear mounting may be obtained by actual test for any individual design, and the best position experimentally determined, whether it be concentric with the center of percussion or concentric with some point intermediate the two or with some point at one side of either of the two points.

In the particular construction shown in Figs. 1 and 2, the rubber ring 16 is depended upon to resiliently transmit the torque reaction of the engine unit to the frame.

In the construction shown in Fig. 5, the cross member 23 carries the rubber blocks 24, which, in turn, are carried and positioned in a member 25 which is secured to the engine unit 1 by the bolts 26. The hold-down bolt 27, the rubber blocks 28, and 29, the plate 30 and the nut 31, act to prevent excessive upward movement of the engine unit 1 with respect to the cross member 23. This construction provides substantially pivotal, as well as orbital movement, but is not so well adapted to transmit torque reaction as the construction shown in Fig. 1. This construction, however, may be used, as will be readily understood by any one versed in the art, as well for the front mounting as for the rear mounting as it is, in effect, a modified form of the mounting shown in Fig. 4.

The torque spring 32 is mounted upon the spring seat 33 and secured thereto by the plates 34 and bolts 35. The ends of the torque spring are positioned between the rubber blocks 36 held in place in the frame 3 by the members 37 and the bolts 38. The spring 32, however, may, if desired, be held between the conical springs 39 which are properly positioned by an internal centering member (not shown) which is secured in place by the bolts 40. The rubber blocks 36 or springs 39 may be used, or the combination shown in Fig. 5, or the springs 39 may be replaced by the rubber blocks 36, or one rubber block and one spring may be used at each end of the spring 32.

In any case, the results will be, in general, the same in that the spring 32 will be resiliently positioned with respect to the frame 3 by a construction which will permit and accommodate for the flexing action of the spring 32 under the forces incident to the operation of the engine unit.

In Fig. 3—A is shown a modified form of mounting in which the springs 40 and 41 are properly mounted to support the engine unit 1 upon the cross-member 23' of the frame and the bolt 42, rubber block 43, spring 44, plate 45, and nut 46 are used to prevent excessive upward movement of the engine unit with respect to the frame cross-member.

It will be seen that this mounting provides substantially the same characteristics as the mountings shown in Figs. 4 and 5. Regardless of which type or construction of mounting is used at the front or at the rear of the engine unit, proper torque means for transmitting engine torque from the engine unit to the frame will be employed, either incorporated in the mountings themselves or by the use of additional torque means such as shown in Fig. 5.

In Fig. 6, the axis T—T is the axis of the crankshaft of the engine unit. The axis P'—P' is an axis parallel to the crank-shaft axis and passing through the center of percussion of the engine unit and the axis G'—G' is an axis which passes through the center of gravity G and the center of percussion P of the engine unit.

While in this invention the rear mounting, in any case, is to be located adjacent the transverse plane which passes through the center of percussion of the engine unit, the front mounting may be so positioned as to cause the axis of oscillation formed by the two mountings to be parallel with the axis T—T as shown at P'—P' in Fig. 6, or converging toward the axis T—T either toward the rear or toward the front mounting.

The axis of oscillation G'—G' passing through both the center of gravity and the center of percussion may also be obtained by the proper location of the front mounting.

In any case, it will be observed that the axis of oscillation intersects the axis through the crankshaft, if at all, at one side or the other of the center of percussion of the engine unit.

I claim:

1. In a mounting of an engine unit upon its frame or support, a resilient rear mounting adjacent the transverse plane through the center of percussion of the engine unit obtained by suspending the engine unit from a point adjacent its front end and located in the longitudinal central vertical plane of the engine unit, and so constructed as to provide for substantial pivotal and orbital movements between the engine unit and its support or frame, and a front mounting between the engine unit and its support or frame so constructed as to provide for substantial pivotal and orbital movements and to resiliently oppose movement thereof in all directions.

2. In the mounting of an engine unit upon its support or frame, resilient means movably mounting the engine unit upon the frame adjacent the transverse plane through the center of percussion of the engine unit obtained by suspending the engine unit from a point adjacent its front end and located in the longitudinal central vertical plane of the engine unit, and means movably mounting the front of the engine unit upon its support or frame and resiliently opposing movement thereof in all directions, said mountings being so constructed as to provide for substantial pivotal and orbital movement of the engine unit with respect to its support or frame.

3. In the mounting of an engine unit upon its support or frame, a resilient rear mounting movably mounting the engine unit upon its support or frame adjacent the transverse plane through the center of percussion of the engine unit obtained by suspending the engine unit from a point adjacent its front end and located in the longitudinal central vertical plane of the engine unit, and a front mounting movably mounting the engine unit upon its support or frame and resiliently opposing movement thereof in all directions, said mountings being constructed and arranged to provide an axis of oscillation for the engine unit passing through the center of percussion of the engine unit.

4. In the mounting of an engine unit upon its support or frame, resilient means movably mounting the engine unit upon its support or frame adjacent the transverse plane passing through the center of percussion of the engine unit obtained by suspending the engine unit from a point adjacent its front end and located in the longitudinal central vertical plane of the engine unit, and means movably mounting the front of the engine unit upon its support or frame and constructed to resiliently oppose movement thereof in all directions, the axis of oscillation provided by said mountings intersecting the axis of the crankshaft at one side of the center of percussion of the engine unit.

5. In a vehicle, the combination with an engine unit, of a front mounting therfor constructed to resiliently oppose movement thereof in all directions, and a resilient rear mounting located approximately in a plane extending transversely of the engine unit through the center of percussion thereof obtained by suspending the engine unit from a point adjacent its front end and located in the longitudinal central vertical plane of the engine unit.

6. In a vehicle, the combination with an engine unit, of resilient front and rear mountings constructed and arranged to support the engine unit for oscillatory movement, the rear mounting being located approximately in a plane extending transversely of the engine unit through the center of percussion thereof obtained by suspending the engine unit from a point adjacent its front end and located in the longitudinal central vertical plane of the engine unit.

7. In a vehicle, the combination with an engine unit, of resilient front and rear mountings constructed and arranged to support the engine unit for oscillatory movement, the rear mounting being located approximately in a plane extending transversely of the engine unit through the center of percussion thereof obtained by suspending the engine unit from a point adjacent its front end and located in the longitudinal central vertical plane of the engine unit, at least one of said mountings being non-metallic and resilient providing for pivotal and orbital movement of the engine unit.

8. In a vehicle, the combination with an engine unit, of a frame, a cross-member connected with the frame, a ring fixed to an end portion of the engine unit, resilient means extending radially between the ring and cross-member and connecting said parts together, and means connecting said frame cross-member and ring and yielding to turning movements thereof but resiliently restraining said turning movements.

9. In a vehicle having an engine unit, a mounting structure for a portion of the engine unit comprising a frame cross-member, resilient means extending approximately radially relative to the crank-shaft of the engine unit between the engine unit and the cross-member and connecting said parts together for pivotal movement of the engine unit relative to the cross-member, and one or more longitudinally yieldable links connecting the engine unit and the cross-member and arranged to yield to turning movements of the engine unit but resiliently restraining said turning movements.

10. In a vehicle, the combination of an engine unit including an engine having a flywheel, said engine unit having a center of percussion adjacent said flywheel obtained by suspending the engine unit from a point adjacent its front end and located in the longitudinal central vertical plane of the engine unit, and means mounting said engine unit in the vehicle comprising non-metallic resilient means located approximately in a plane extending transversely of the engine unit through the center of percussion thereof.

11. In a vehicle having a frame, the combination with an engine unit including an engine having a flywheel, said engine unit having a center of percussion adjacent said flywheel obtained by suspending the engine unit from a point adjacent its front end and located in the longitudinal central vertical plane of the engine unit, of means for mounting said engine unit on the vehicle including a cross-frame member having an apertured portion surrounding at least a part of the engine unit, and non-metallic resilient means joining said apertured portion of the cross-frame member and the engine unit, said non-metallic resilient means being located approximately in a plane extending transversely of the engine unit through the center of percussion thereof.

ROLLAND S. TROTT.